United States Patent [19]

Young

[11] Patent Number: 5,010,620

[45] Date of Patent: Apr. 30, 1991

[54] STALL AND PASTURE VACUUM MACHINE

[76] Inventor: Ronald E. Young, Rte. 1, Box 1340 OSR, Bryan, Tex. 77803

[21] Appl. No.: 355,482

[22] Filed: May 22, 1989

[51] Int. Cl.⁵ .............................................. B60P 1/34
[52] U.S. Cl. .......................................... 15/347; 15/89; 15/340.3; 15/348; 15/352
[58] Field of Search ................... 15/347, 340.3, 348, 15/349, 89, 352

[56] References Cited

U.S. PATENT DOCUMENTS

| | | |
|---|---|---|
| 1,346,433 | 7/1920 | Varland . |
| 2,887,714 | 5/1959 | Hanson ............................ 15/347 X |
| 3,184,777 | 5/1965 | Norden ............................ 15/340.3 |
| 3,203,022 | 8/1965 | Clarke ............................. 15/347 X |
| 3,490,090 | 1/1970 | Harrison ......................... 15/340.3 X |
| 3,744,653 | 7/1973 | Jensen ............................. 15/347 X |
| 3,790,986 | 2/1974 | Burger ............................. 154/328 |
| 3,901,008 | 8/1975 | Taylor et al. ................... 56/344 |
| 4,185,355 | 1/1980 | Williams ......................... 15/344 |
| 4,221,018 | 9/1980 | Hajdu ............................. 15/347 |
| 4,567,623 | 2/1986 | Walton ............................ 15/337 |
| 4,643,776 | 2/1987 | Hollowell et al. ............... 134/21 |
| 4,809,380 | 3/1989 | Van Ginhoven et al. ....... 15/348 X |

FOREIGN PATENT DOCUMENTS 83840 7/1983 European Pat. Off. .......... 15/340.3

Primary Examiner—Chris K. Moore
Attorney, Agent, or Firm—Kirk & Lindsay

[57] ABSTRACT

The present invention is directed to a stall and pasture vacuum machine which comprises a trailer frame supported by an axle and wheels, a receptacle which is pivoted at one end of the frame and at the other end of the frame is an extension which supports a centrifugal blower and its drive. In addition, the extension supports a sweeper head or mucking device which is mounted on a pair of sleds which will be pulled over the pasture or paddock. A body is attached to the sled such that the closed top and ends surround and support a rotating shaft. The rotating shaft has a plurality of modified spring tines or blades for breaking up the manure in the pasture and allowing it to be vacuumed by the centrifugal blower into the receptacle. Also on the extension is a water tank for supplying a fine mist of water to the receptacle especially when dust is also being drawn into the receptacle with the manure from the paddock or pasture.

6 Claims, 4 Drawing Sheets

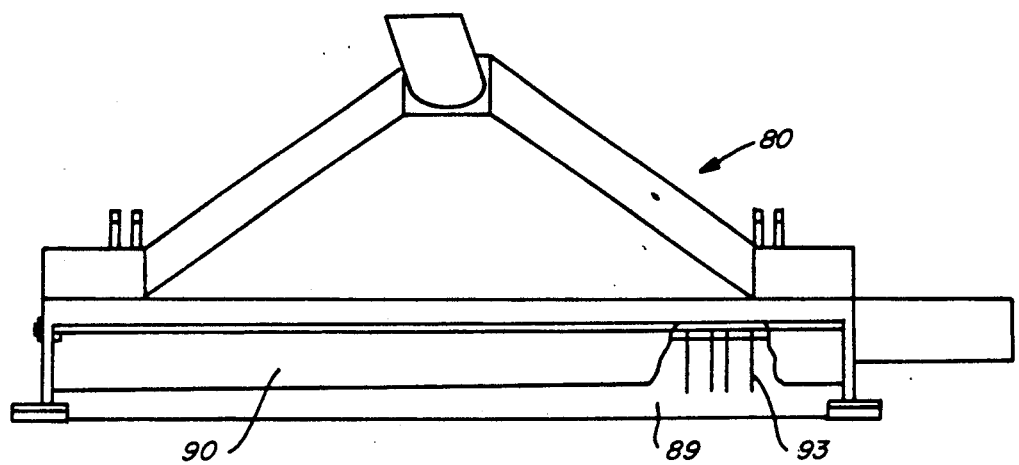
FIG. 4
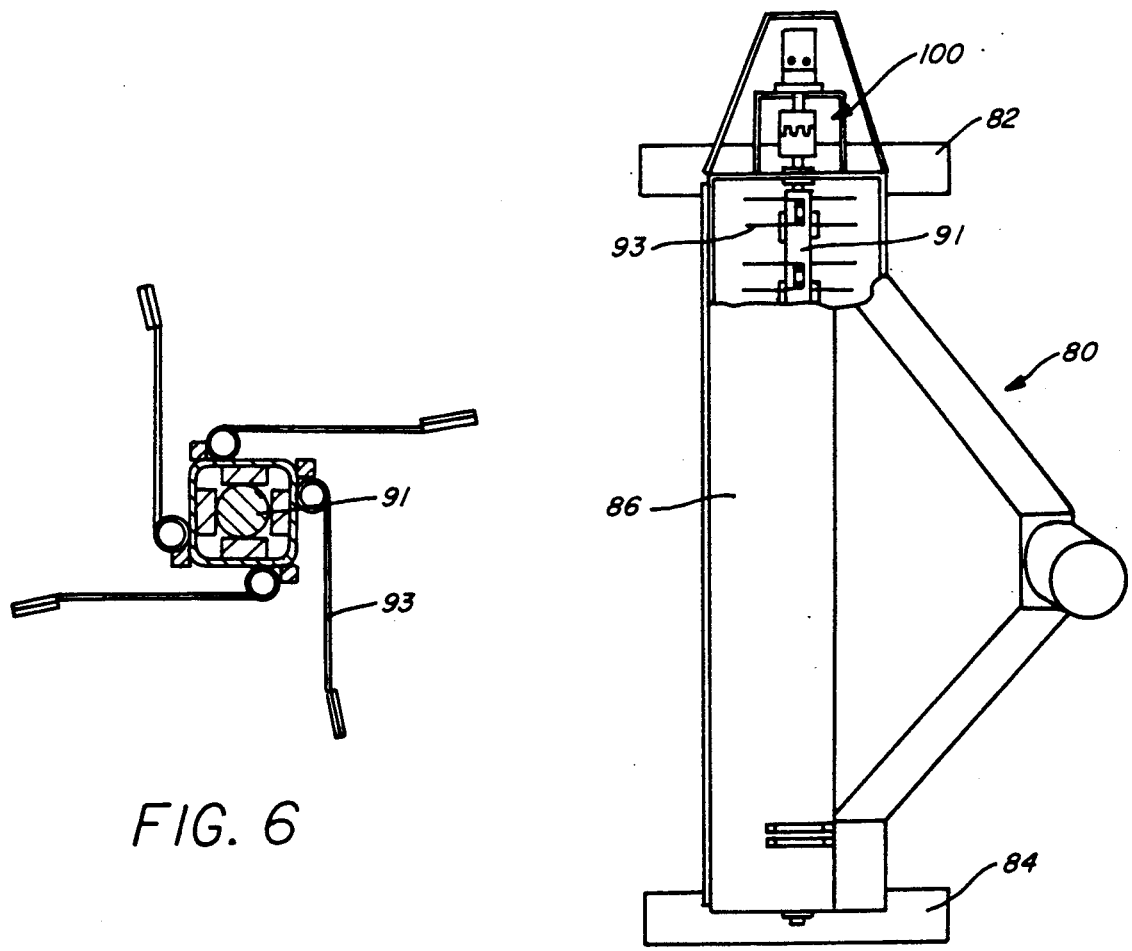
FIG. 6
FIG. 5

STALL AND PASTURE VACUUM MACHINE

FIELD OF THE INVENTION

The present invention is directed to a stall and pasture vacuum machine having the dual purpose of first, replacing the labor intensive and old fashion way of "mucking" stalls by hand, and second, cleaning pastures and paddocks of manure. More specifically, the stall and pasture vacuum machine comprises a trailer frame having a receptacle which pivots at one end of the frame. On an extension at the other end of the frame is a centrifugal blower and drive means whereby the manure is vacuumed and blown by the centrifugal blower into a receptacle supported by the frame. Still more specifically is a sweeper or field mucker device for cleaning the pastures or paddocks which is a device adapted to be pulled on a pair of sleds and having a body with a rotating shaft which will break up the manure to be vacuumed by the centrifugal blower and moved to the receptacle on the trailer frame.

BACKGROUND OF THE INVENTION

1. Statement of the Problem

Horsemen have been plagued by the labor intensive task of "mucking" stalls by hand. The stalls, as well as pastures and paddocks, become infested with equine parasites with the build-up of manure. These parasites are then ingested by horses when forced to graze around these manure piles. Horses divide pastures into roughs where they defecate and lawns where they graze. Unless pastures are overgrazed, the horses will not graze the roughs. However, it has been found that when the roughs are cleaned of manure, not only is the area used for grazing increased but more importantly, it is a most effective way to control parasites.

The approach to the problem has been to administer wormers drugs on a seasonal basis, early enough to kill adult worms and prevent horses from passing eggs in their manure. Several serious drug-related problems have surfaced in recent years with the use of worming drugs. The most serious of these are drug resistance by horses to the worming drugs, inability of drugs to protect weanling and yearling horses, and adverse ecological effects of the drugs excreted in the manure. This approach of using drugs to control parasites and other hygiene related problems of horses is not a satisfactory solution.

The most effective solution to control parasites is to include pasture hygiene as part of the strategy. Heretofore however, there have been no effective devices to clean the pastures and paddocks of manure. Further, when the manure is removed to a compost pile where the heat produced in the biodegrading processes will kill the worms and eggs, a mulch material is produced which may be used as an organic fertilizer.

2. Prior Art

U.S. Pat. No. 1,346,433 discloses a combined manure loader and spreader. The patent discloses a machine where the forward portion may drop so that the beater cylinder of the machine can act as a loader or in the loading position whereas if the forward portion is maintained in the vertical position, the machine is in the distributing position.

U.S. Pat. No. 3,790,986 discloses a debris pick-up and collection apparatus. The apparatus sucks debris upwardly from the ground through an upper opening into a receptacle. The air stream is provided by upper and lower impeller blades 70 and 71 which are disposed in opposite relation. A bristled cylindrically shaped brush mounted on a rotatable shaft sweeps material up to the impeller blades. The debris after it passes through the blades is then densely compacted into a bag.

U.S. Pat. No. 3,901,008 discloses a crop gathering apparatus. The crop gathering apparatus has an assembly 39 having a rotatable flail unit 41 extending transversely to the normal direction of travel of the apparatus and operable to pick up hay or other trough refuse and to throw the material rearwardly into a crop receiving unit 42. The crop receiving unit 42 is connected to a crop blowing unit 43 which raises the crop into a wagon 21. The wagon frame 27 has a pivotal connection at 27 which in the middle of the frame so that the wagon is tilted to discharge a stack 22 from the rear of the wagon.

U.S. Pat. No. 4,185,355 discloses an apparatus for cleaning up animal feces deposits. This patent discloses a hand held device with a fan at the end for drawing the feces into a disposable bag 50. The apparatus can be easily disassembled at the joint 20 for disposing of the bag and inserting a new bag within the device.

U.S. Pat. No. 4,567,623 discloses a leaf and debris collector. This patent discloses a fan 10 mounted on a wagon 10 which can be towed and moved. The debris is collected in a bag 24 attached to the back of the wagon. The intake to the blower may be through a intake head 18 or alternatively through a flexible duct 36 with an intake hood 38 which is hand operable.

U.S. Pat. No. 4,643,776 discloses a battery powered vacuum trash collector. This patent discloses a device mounted on a cart or vehicle which is run from batteries. The blower is mounted on the back of the vehicle with the pick-up head at the front of the vehicle while a container for collecting the trash or debris is located below the fan at the back of the vehicle. The specific aspects of the patent are directed to a method of maximizing the suction and not to the specific structure of the vacuum device.

None of the foregoing patents disclose an efficient and effective device for mucking stalls or cleaning pastures or paddocks.

SUMMARY OF THE INVENTION

The present invention is directed to a stall and pasture vacuum machine which comprises a trailer frame supported by an axle and wheels, a receptacle which is pivoted at one end of the frame and at the other end of the frame is an extension which supports a centrifugal blower and drive means. In addition, the extension supports a sweeper head or mucking device which is mounted on a pair of sleds which will be pulled over the pasture or paddock. A body is attached to the sled such that the closed top and ends surround and support a rotating shaft. The rotating shaft has a plurality of modified spring tines or blades for breaking up the manure in the pasture and allowing it to be vacuumed by the centrifugal blower into the receptacle. Also on the extension is a water tank for supplying a fine mist of water to the receptacle especially when dust is also being drawn into the receptacle with the manure from the paddock or pasture.

The stall and pasture vacuum machine is preferably connected to and driven by a tractor having a power drive (p.t.o.) and a hydraulic system. The p.t.o. of the tractor is connected to the power train of the centrifugal blower and the hydraulics are used to rotate the shaft of the sweeper or mucking device, to raise and lower the sweeper and to elevate one end of the receptacle or raise the receptacle to dump the collected manure.

BRIEF DESCRIPTION OF THE INVENTION

The stall and pasture vacuum machine of the present invention is the product of research directed to worm and colic control of horses. To control these problems it has been shown that the regular removal of manure not only from stalls but also from pastures and paddocks provides an excellent solution. Another advantage of the stall and vacuum machine of the present invention is that from the manure which it collects, a fine mulch material can be produced, that composts easily for use as an organic fertilizer and can be spread back on pastures in 14 to 21 days.

BRIEF DESCRIPTION OF THE DRAWINGS

FIG. 4 is a front elevational view of the sweeper or mucking device;

FIG. 5 is a top cross-sectional view of the sweeper or mucking device showing the rotating shaft; and FIG. 6 is a cross-section of the rotating shaft of the sweeper head or mucking device showing the specific structure of the tines or blades.

Referring now to FIG. 1, the stall and pasture vacuum machine includes a trailer 10 which is attached to a tractor (not shown). The tractor has a draw bar or trailer connector for connection to the convertor 11 on the trailer 10 and a p.t.o. or power drive 6. The tractor also is equipped with a hydraulic power system and hydraulic connectors 8 (see FIG. 2) which will be used on the trailer 10 as described in more detail hereinafter. The hydraulic system requires sufficient power to power the hydraulic needs of the stall and pasture vacuum machine and with all the preferred hydraulic uses a minimum of 37 to 40 horse power has been found adequate.

Figure 1:
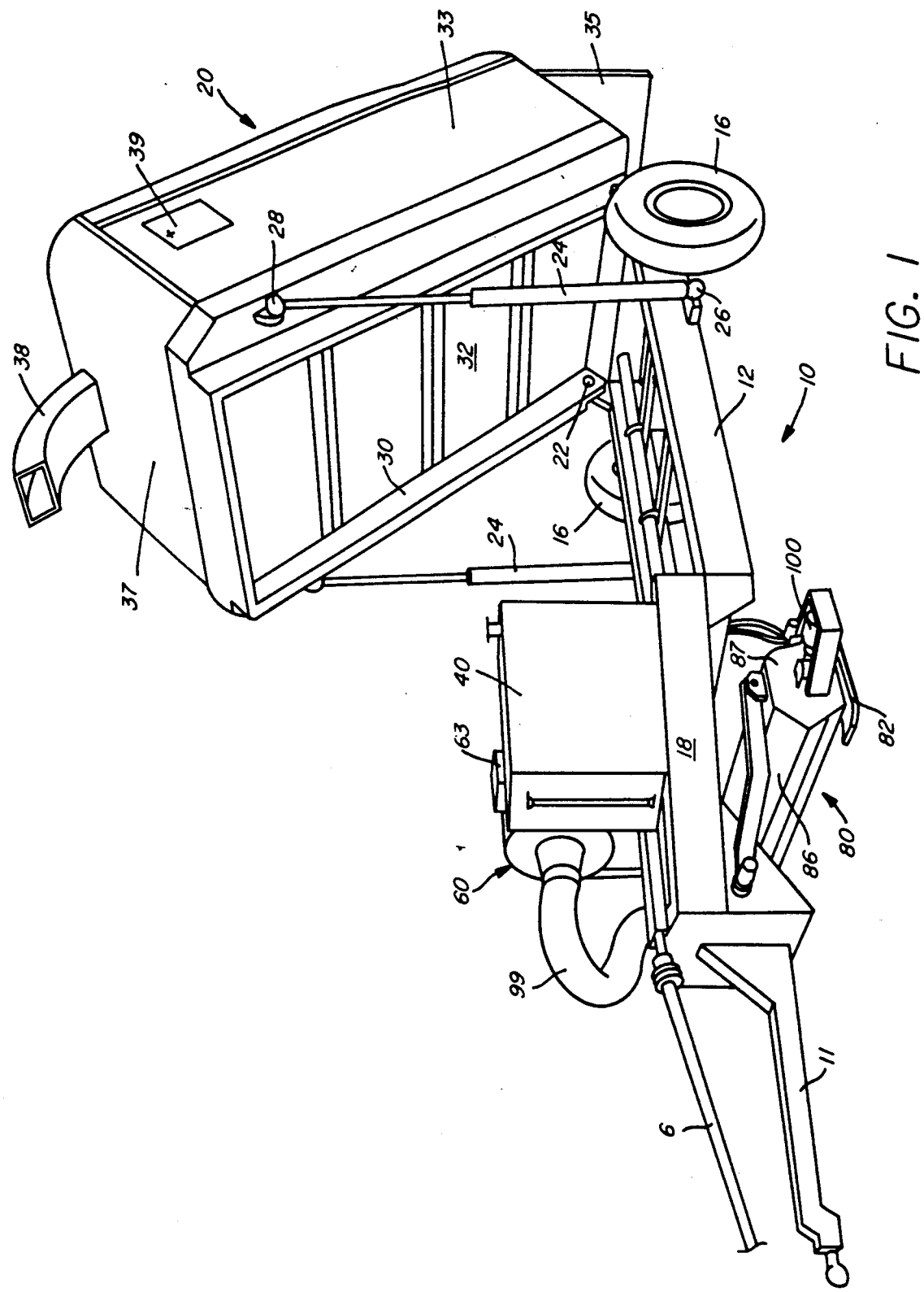
FIG. 1 discloses a preferred embodiment of the stall and pasture vacuum machine of the present invention. The perspective view shows the trailer frame, the extension with the centrifugal blower, a water tank and the sweeper head or mucker device below the frame, and the receptacle in the raised position.

The trailer 10 has a frame 12 which is supported by an axle 14 to which are attached at either end wheels 16. A single axle such as a 6000 pound axle 14 may be used. While a single axle has been found sufficient, the trailer may have a double axle with four wheels. Frame 12 includes an extension 18 which extends from the front of frame 12. The extension 18 is preferably a truncated V-shape which is attached to and above the frame 12. A receptacle 20 or hopper which may preferably be of about 10 cubic yard capacity is supported by the frame 12. The receptacle 20 is hinged by hinges 22 to the frame 12 at the rear of the frame. Two quick action hydraulic cylinders 24 are used to elevate or lift one end of the receptacle 20 as illustrated in FIG. 1. Each hydraulic cylinder 24, which includes a cylinder rod, is connected at one end 26 to the frame 12 and the other end 28 to the receptacle 20. A hydraulic line 8 from the tractor 2 is connected to the cylinders 24 and when hydraulic fluid is actuated through that line 8, the cylinders 24 are extended as shown in FIG. 1 raising the receptacle or hopper 20. The receptacle 20 has a base 30 which is the portion hinged to the frame 12. A continuous bottom 32 and sides 33 and top 34, except for a vent in the top, form the closed rectangular hollow body of the receptacle 20. The back end 35 of the receptacle or hopper 20 is hinged at 36 so that this end 35 can be opened to dischange the manure and other material collected in the receptacle 20. The other end 37 is closed except for an access member 38 which provides an inlet to the receptacle 20. The access member 38 extends within the receptacle 20 preferably beyond the vent which extends across the top 34 near or at the front end as viewed in FIG. 1. The access member 38 and its function will be described in more detail hereafter. On one side is an inspection door 39 for looking into the receptacle 20.

The extension 18 to the frame 12 supports above the extension a water tank 40, a drive train 50 and a centrifugal blower 60. The water tank 40 is preferably made of stainless steel. The water tank may have a capacity of up to 100 gallons or more. Preferably the water tank 40 is positioned on and above the extension 18 on one side of the drive train 50 and on the side opposite the water tank 40 is the centrifugal blower 60.

Figure 2:
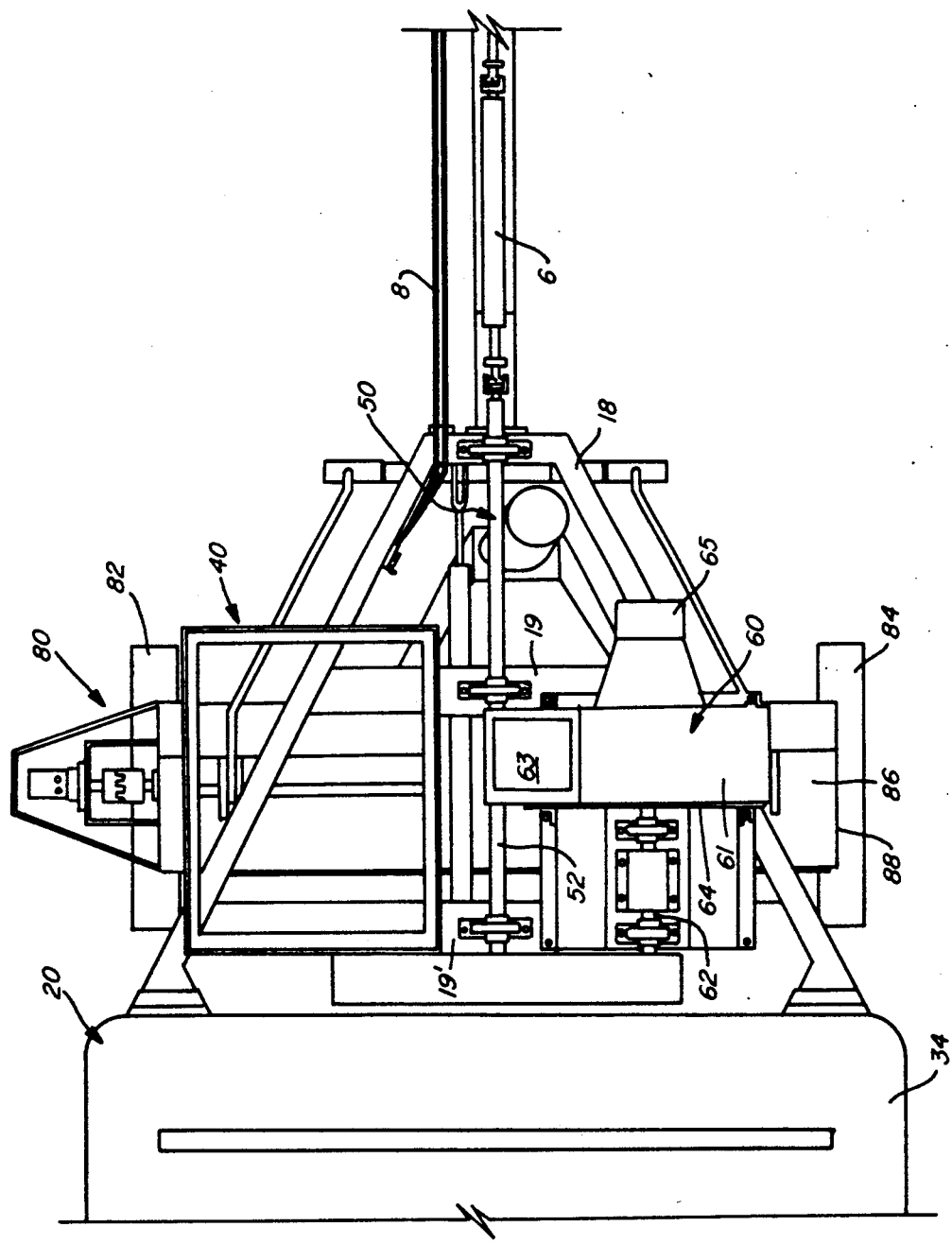
FIG. 2 is a top view of the extension portion of the frame showing the drive train, the top of the centrifugal blower and a frame for the water tank, and one end of the sweeper or mucker device.

Referring now to FIG. 2, the drive train 50 comes in at the truncated V-shaped portion of extension 18 and essentially divides the extension 18 in two portions. The water tank 40 is placed on one side of the extension 18 and the blower 60 is on the opposite side to balance the weight of these two major pieces. The drive shaft 52 may have supports on extension 18 as shown at 19 and 19'. The drive shaft 52 is connected to a pulley drive 54 wherein the pulley drive is within the pulley housing 56. The pulley drive 54 rotates the centrifugal blower 60 by rotating blower drive shaft 62 as shown in more detail in FIG. 3. The power for the blower may be from the tractor through the tractor's p.t.o. or drive shaft 6. Alternately, if the p.t.o. of a tractor is not attached to the drive shaft 52, the centrifugal blower 60 may be powered by an electric motor or gasoline or diesel engine.

Figure 3:
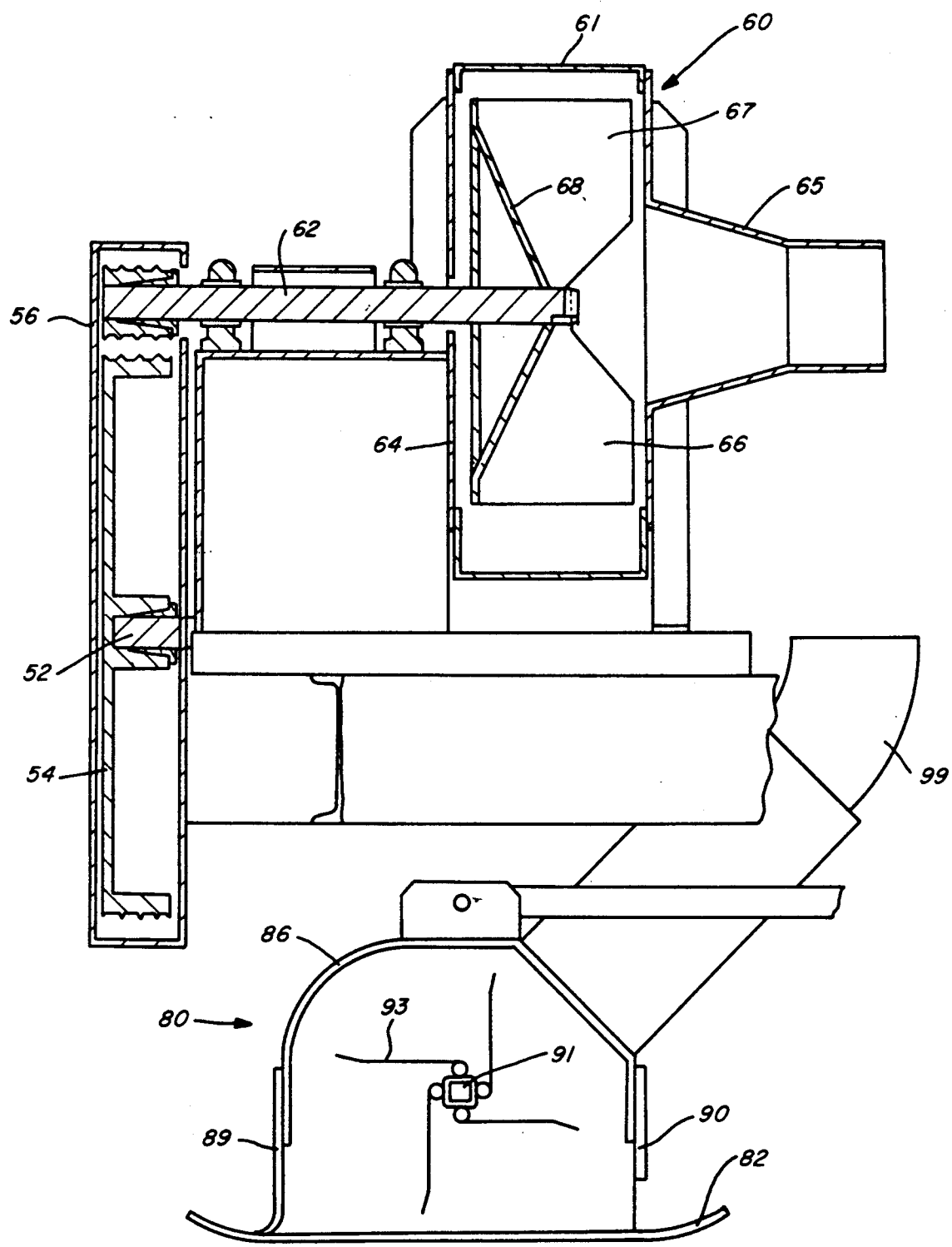
FIG. 3 is a cross-sectional view of the blower and pulley device and also a cross-section of the sweeper or mucking device.

Referring now to FIG. 3, the details of the centrifugal blower 60 are set forth in more detail. The blower 60 has a cylindrical housing 61 in which the blower drive shaft 62 enters at the center rear. Adjacent the cylindrical housing 61 is a vertical outlet 63. A backing 64 on the cylindrical housing 61 seals the back portion of the housing 61 and a funnel shaped inlet 65 is on the front of the housing 61, the opening of the funnel shaped inlet 65 being covered by a gravity hinged protector when not connected to a flexible hose as will be described in more detail hereinafter. At the end of the drive shaft 62 is a blower fan blade 66 which has a solid back and six blade members 67 extending equally around the shaft. Deflector members 68 are attached to the blades to change the direction of the manure and other material entering the blower inlet 65 axially of the blower 60 towards the vertical outlet 63.

The rotation of the drive shaft 52 is multiplied many times through the pulley drive 54 so that the drive shaft 62 of blower 60 will rotate at many more revolutions per minute (rpm) than drive shaft 52. The pulley drive 54 preferably has a multiplier of about seven and rotates drive shaft 62 of blower 60 in the range of 3500 to 3750 rpm. The centrifugal blower 60 therefore is a substantial vacuum pump and has a substantial capacity for drawing the manure up to the blower and through the vertical outlet 63 into the receptacle 20.

Referring again to FIG. 1, below the extension 18 is a sweeper or mucking device 80 for removing manure from a pasture or paddock. The front of the sweeper or mucking device 80 is shown in FIG. 4. The sweeper or mucking device 80 comprises a pair of sleds 82 and 84 which when in the lowered or operating position slide on the ground. Mounted on sleds 82 and 84 is a body 86. Body 86 has closed ends 87 and 88 which are mounted on the sled 82 and 84 respectively. Extending from the back portion of body 86 is a rubber member or curtain 89 which drags on the ground and closes the back portion of the sweeper head 80. As illustrated in FIGS. 4 and 5, a rubber member 90 hanges in the front but is slightly open so as to allow piles of manure to enter the sweeper head 80. Inside the body 86, as illustrated in FIG. 5, is a rotating shaft 91. Attached to the shaft 91 are a plurality of tines or prongs 93. The tines or prongs 93 are spaced along the shaft 91 such that when they are rotated they come in contact with the manure entering the opening of the mucking device or sweeper head 80 as illustrated in FIG. 4. A detail of the tines or prongs 93 is shown in FIG. 6 wherein connected to the shaft 91 is a member 94 which supports a plurality of spring members 96 at right angles to one another as illustrated in FIG. 5. Member 94 may be attached to the shaft 91 such as to have a varying design of the tines or prongs 93. The tines 93 break up and lift the manure, especially fresh or wet manure, so that the manure is drawn into the body 86 and forward to the outlet 98 by the centrifugal blower 60 for collection in the receptacle or hopper 20.

A centrifugal blower 60 with a seven inch blade and having a capacity of between 4000 and 5500 cubic feet per minute (cfm) has been found adequate to move the manure from the ground to the receptacle or hopper 20. Several smaller capacity blowers were found insufficient to move the manure and when wet manure hit the blower blades the blowers were slowed sufficiently that they did not work. The vacuum produced by the centrifugal blower 60 is about 18" to 20" water gauge pressure (wgp). The preferred centrifugal blower 60 is a 5000 cfm blower with a 19¼" wgp. This size blower provides the necessary flow and vacuum for the six foot long sweeper head or mucking device 80. The centrifugal blower 60 has a flexible hose 99 which connects the funnel shaped inlet 65 of the centrifugal blower 80 to the outlet 98 of the sweeper or mucking device 80.

The flexible hose 99 may be connected to a hand held mucking device to clean stalls. It is most convenient to have a pneumatic tube installed in a barn having a number of stalls in a row and the flexible hose 99 connected to that tube outside the barn or through a barn door with any number of connections to that pneumatic tube for cleaning the individual stalls. The stall and pasture vacuum machine of the present invention has sufficient capacity to serve each of these situations.

One problem which has been encountered was the moving of fresh manure through the vertical outlet 63 of the blower 60 and the access member 38. Access member 38 is a part of the front end 37 of the receptacle or hopper 20. When the receptacle or hopper 20 is in the operating position or is setting on the frame 12, access member 38 is lowered to and surrounds at one end the vertical outlet 63 and seals the two together. The problem was the accumulation or sticking of the manure and other material in the turns from the blower 60 to the receptacle 20. This problem has been overcome by decreasing the internal diameter within the turns providing a venturi effect, for example the 90° turn in the access member 38 from the vertical outlet 63 to the receptacle 20.

The hydraulic connections 8 have been described for lifting the receptacle or hopper 20 to a position to empty the hopper. Hydraulic connections 8 are also used in the preferred embodiment to rotate the shaft 90 in the sweeper or mucking device 80. As illustrated in FIG. 2, the shaft 90 may be rotated by hydraulic motor 100. Also illustrated in FIG. 2, a hydraulic cylinder 102 is used to lift the sweeper or mucking device 80 off the ground when the trailer 10 is transported between pastures or when used in the barn area.

The water tank 40 is connected by an electric pump to supply water to the inside of receptacle 20. When the sweeper or mucking device 80 is used in the pasture, dust and other debris may be blown through the system into the hopper 20. To settle the dust in the hopper 20 a spray of water is introduced through nozzles attached on the ceiling inside receptacle or hopper 20. When the water tank 40 is placed on the extension 18, it is placed opposite the centrifugal blower 60 so as to equalize the weight on the extension 18.

Modifications of the stall and pasture vacuum machine of the present invention may be made and still be within the invention as more distinctly set forth in the following claims.

I claim:
1. A stall and pasture vacuum machine comprising:
   a trailer frame supported by an axle and wheels;
   an extension at the one end of said frame;
   centrifugal blower means mounted on said extension, said blower means having a vertical outlet;
   drive train means mounted on said extension and connected to a pulley drive, said pulley drive rotating said blower means;
   a mucking device supported by and below said extension, said mucking device having a pair of skids adapted to be pulled along the ground;
   receptacle means pivoted at the other end of said frame, said receptacle means having inlet means connectable to said vertical outlet of said blower means; and
   flexible hose means connected to said mucking device whereby said blower means will suck manure on the ground into said receptacle means.

2. A machine according to claim 1 which further includes:
   a pair of hydraulic cylinders; one end of each of said cylinders connected to said frame and the other end connected to said receptacle means, said cylinders lifting one end of said receptacle means for emptying said receptacle means.

3. A machine according to claim 1 which further includes:
   said blower means having a funnel shaped inlet, and said flexible hose being connected to said funnel shaped inlet axially of said blower means.

4. A machine according to claim 1 wherein said mucking device further includes:
   a body, said body having a closed top and closed ends, each end of said body attached to a sled such that the body is maintained above said sleds;

a rotating shaft within said body, one end of said shaft terminating adjacent each of said sleds;
means fixed to said shaft for rotating below the body; and
means for rotating said shaft.

5. A machine according to claim 4 wherein said rotating means for rotating said shaft is a hydraulic motor.

6. A machine according to claim 1 which further includes a water tank connected to the receptacle for supplying water inside said receptacle.

* * * * *